Sept. 15, 1970  C. L. CASE  3,528,519
SPEED, STEERING AND DIRECTION CONTROL FOR VEHICLES
Original Filed March 23, 1967  3 Sheets-Sheet 1

INVENTOR
Cecil L. Case

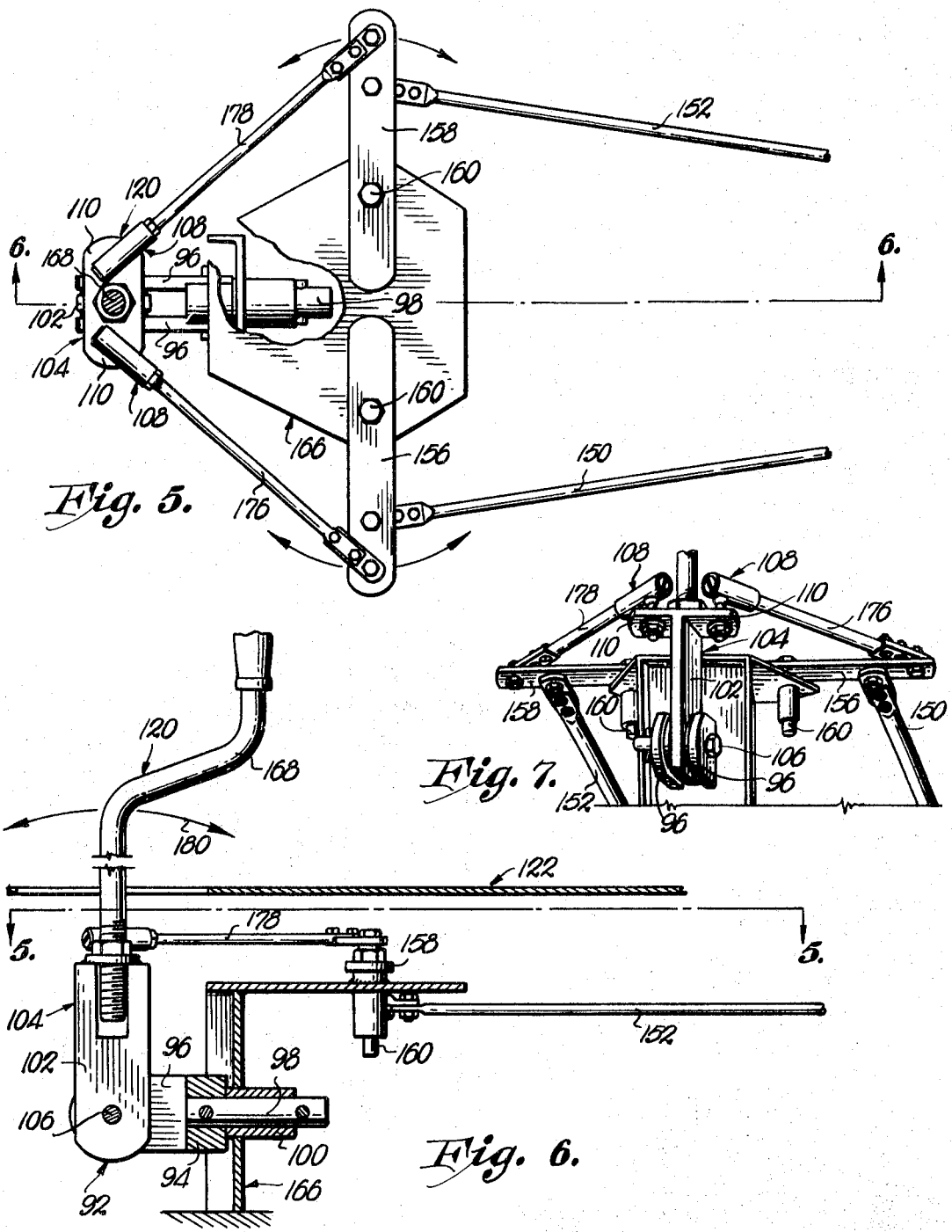

Sept. 15, 1970     C. L. CASE     3,528,519
SPEED, STEERING AND DIRECTION CONTROL FOR VEHICLES
Original Filed March 23, 1967     3 Sheets-Sheet 3

INVENTOR
Cecil L. Case
BY

United States Patent Office 3,528,519
Patented Sept. 15, 1970

3,528,519
SPEED, STEERING AND DIRECTION CONTROL FOR VEHICLES
Cecil L. Case, Newton, Kans., assignor to Hesston Corporation, Inc., Hesston, Kans., a corporation of Kansas
Original application Mar. 23, 1967, Ser. No. 625,378, now Patent No. 3,431,993, dated Mar. 11, 1969. Divided and this application Jan. 17, 1969, Ser. No. 810,429
Int. Cl. B62d 11/04
U.S. Cl. 180—6.48                           2 Claims

ABSTRACT OF THE DISCLOSURE

A vehicle control which includes an operating lever interconnected through linkage with a pair of hydraulic fluid regulating devices and mounted for pivotal movement about one axis to operate both devices in the same direction for speed and reversing control, and about a second axis to operate the devices simultaneously in opposite directions for steering the vehicle.

---

This is a division of my copending application Ser. No. 625,378, filed Mar. 23, 1967, now U.S. Pat. No. 3,431,993.

This invention relates to vehicle controls, and more particularly, to a steering and speed control for hydraulically driven vehicles such as farm implements.

Many self-propelled harvesters and other farm implements are provided with separate drives for individual ground wheels whereby the vehicle may be steered by altering the speed imparted to one or the other of the wheels. The drives for the respective wheels may be operated together for putting the vehicle in motion in a given direction and at the desired speed. Any alteration of the vehicle speed requires simultaneous and corresponding control for the separate drives if the vehicle is to remain in the selected direction of travel. Steering of the vehicle while moving, however, requires that the speed of one drive be changed relative to the speed of the other drive, all without departing from the overall speed at which the vehicle is moving. Stated another way, it is important that vehicles of this type be steerable at any given speed range at which the vehicle may be operated.

Various ways have been suggested for providing suitable controls for mechanical drive trains in vehicles of this type. Examples may be found in the disclosures of U.S. Pats. No. 2,936,840 and No. 2,924,993. While these controls are suitable for use with vehicles provided with mechanical drives, the use of hydraulic motors for driving the implement ground wheels has necessitated a new type control for the vehicle hydraulic systems.

Accordingly, it is the primary object of this invention to provide a control for hydraulically driven vehicles for not only controlling the speed and direction of movement of the vehicle, but also capable of effecting steering of the vehicle throughout the entire range of available vehicle speeds.

It is another important object of the invention to provide such a control which is simple and easy for the vehicle operator to manipulate by one hand, thereby providing the desired control of the vehicle while leaving the other hand free for other activities in operating the machine.

These and other important objects of the instant invention will be further explained or will become apparent in the specification, claims and drawings.

Figure 1:
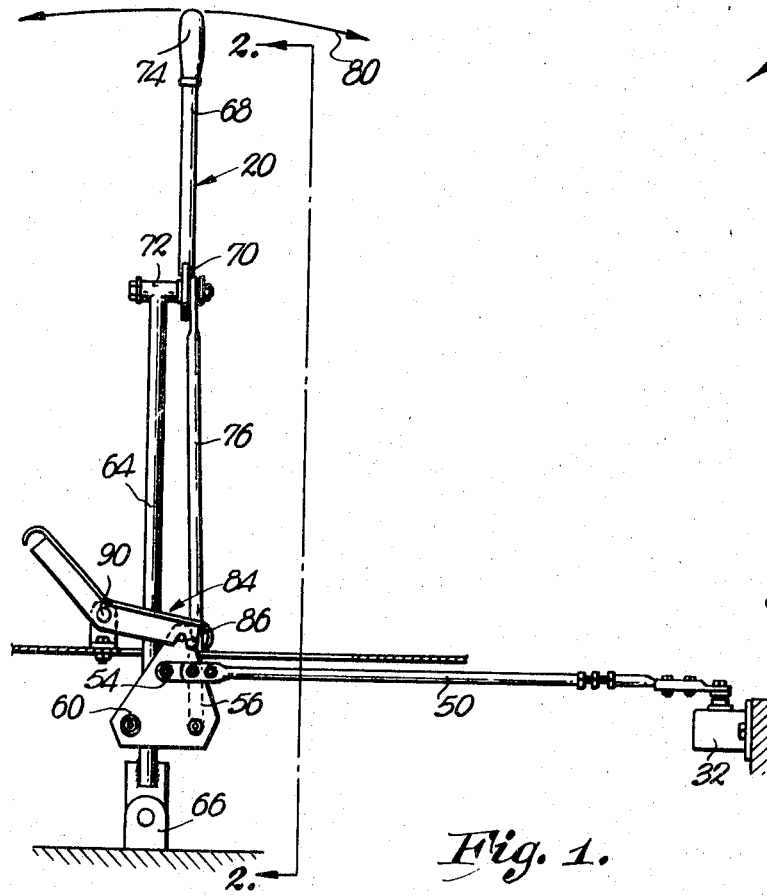
Figure 2:
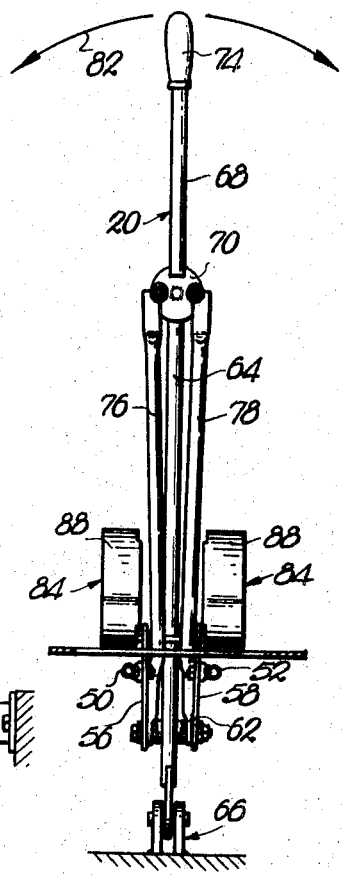
Figure 3:
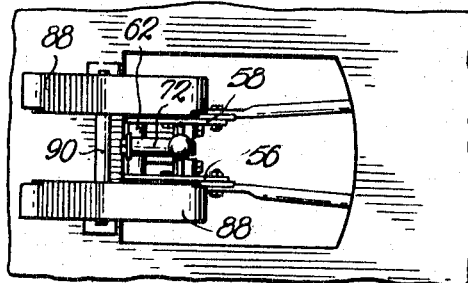
Figure 4:
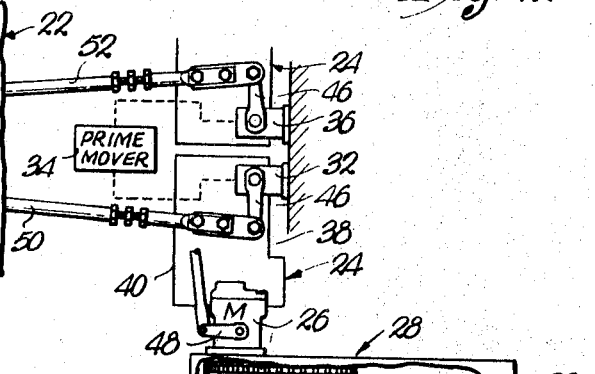
Figure 8:
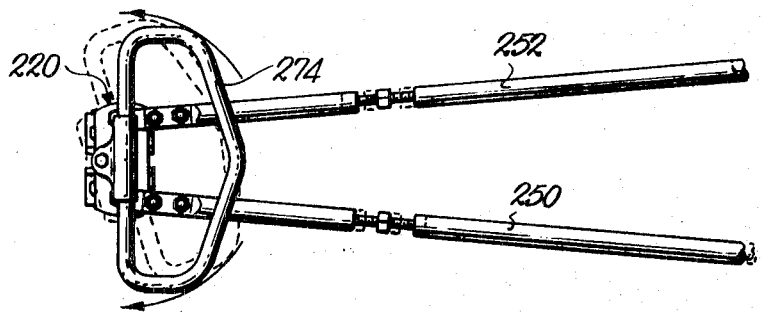
Figure 11:
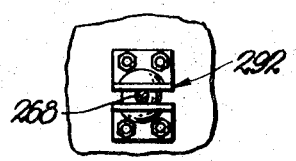
Figure 9:
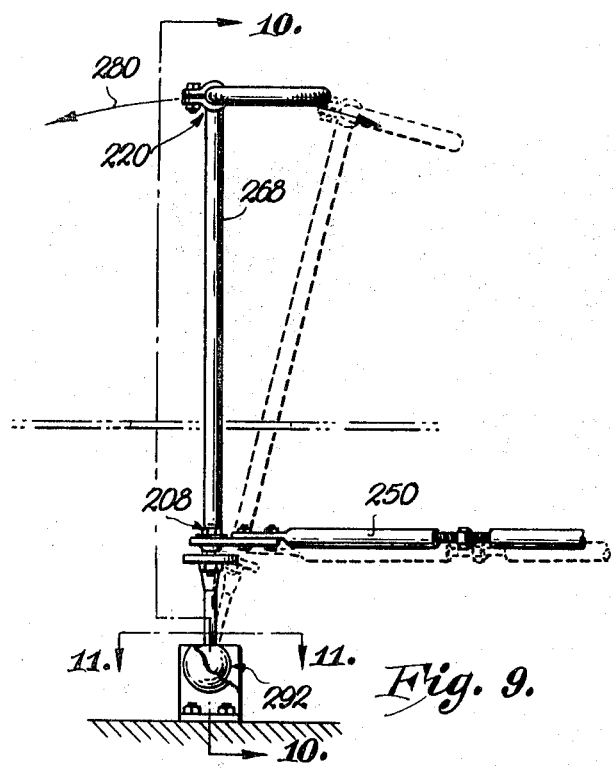
Figure 10:
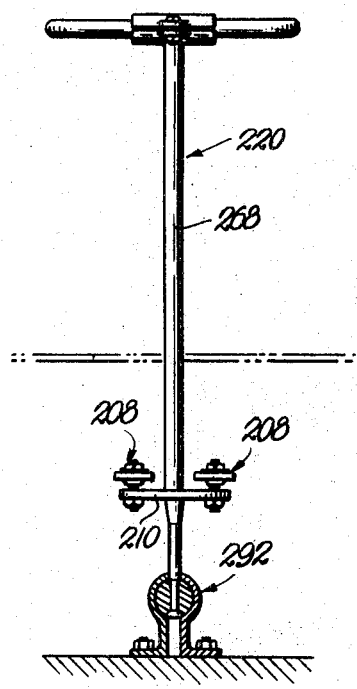
Figures 12, 13:
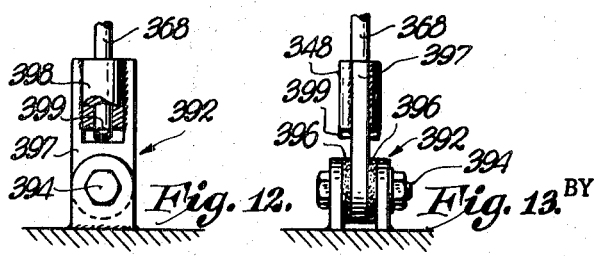

In the drawings:
FIG. 1 is a side elevational view of one embodiment of the control of this invention;
FIG. 2 is a vertical, cross-sectional view taken along line 2—2 of FIG. 1, parts appearing in elevation;

FIG. 3 is a fragmentary, top plan view partially schematic, showing the control of FIG. 1 and associated parts of the vehicle drive system;
FIG. 4 is an enlarged, fragmentary, top plan view of a hydraulic system fluid flow regulating device, parts being broken away and shown in cross section to reveal details of construction;
FIG 5 is a horizontal, cross-sectional view taken along line 5—5 of FIG. 6 and illustrating a modified form of control operating mechanism; FIG. 6 is a vertical, cross-sectional view taken along line 6—6 of FIG. 5; FIG. 7 is a fragmentary, front perspective view of the mechanism of FIG. 5;
FIG. 8 is a view similar to FIG. 5 but illustrating another modified form of operating mechanism; FIG. 9 is a side elevational view of the mechanism of FIG. 8; FIG. 10 is a vertical, cross-sectional view taken along irregular line 10—10 of FIG. 9, parts being shown in elevation; FIG. 11 is a horizontal, cross-sectional view taken along line 11—11 of FIG. 9, parts appearing in elevation;
FIG. 12 is a fragmentary side elevational view of a modified form of universal joint which is capable of use with the embodiment of FIGS. 8–11; and FIG. 13 is a fragmentary rear elevational view of the joint of FIG. 12.

A control 20 embodying the principles of this invention is illustrated in FIGS. 1–3 in connection with a vehicle 22 only fragmentarily illustrated. The vehicle 22 includes a pair of separate hydraulic drive systems 24. Each of the systems 24 may be identical. Accordingly, only one system 24 has been illustrated in its entirety in FIG. 3.

System 24 may include a hydraulic motor 26 operably coupled through a drive 28 with a ground-engaging drive wheel 30 for vehicle 22. It will be understood that the other system 24 is operably coupled with a second drive wheel (not shown) for the vehicle. A fluid flow regulating device 32 which, in the embodiment of the invention illustrated, comprises a variable displacement hydraulic pump, is operably coupled with the vehicle prime mover 34. An identical device 36 for the other hydraulic system 24 is also operably coupled to prime mover 34. A hydraulic line 38 leads from the discharge outlet of pump 32 and is connected with the inlet of motor 26. Similarly, a hydraulic line 40 leads from the outlet of motor 26 to the inlet of pump 32. Pump 32 may be any of a number of available variable displacement types including a pump as illustrated best in FIG. 4 and having a plurality of pistons 42, the displacement of which is controlled by the angle of disposition of a movable swash plate 44 controlled by an exterior arm 46.

Manifestly, the angularity of swash plate 44 may be moved by arm 46 in varying amounts whereby the hydraulic fluid flowing through lines 38 and 40 may be varied in speed and direction. At one position of the swash plate 44, the operation of pump 32 by the prime mover causes no flow of fluid in the hydraulic lines. At this neutral position, no power is imparted to the ground wheels of the vehicle. From this neutral position, movement of arm 46 is one direction causes rotation of the ground wheels of the vehicle in a corresponding direction and the speed of such rotation is dependent upon the extent of swinging movement of arm 46. On the other hand, movement of arm 46 in the opposite direction from its neutral position causes, in an increasing manner, the rotation of a vehicle ground wheel in the opposite direction.

Motor 26 may be constructed identical to the devices 32 and 36 and it has been found desirable in some instances to utilize the swash plate adjusting arm of motor 26 to provide a high and low speed range for the vehicle ground wheels. Neither of the devices 32–36 nor motor 26 form a part of this invention per se and it will be readily understood by those skilled in the art that other types of hydraulic motors and hydraulic fluid flow regulating devices could be utilized.

Each of the arms 46 of the devices 32 and 36 are operably coupled with the control 20 by elongated, shiftable connecting rods or linkage 50 and 52 respectively. One end of the respective rods is pivotally coupled with a corresponding arm 46 and the other end of rods 50 and 52 are pivotally coupled at 54 with a corresponding one of a pair of spaced-apart, parallel, irregularly-shaped plate elements 56 and 58 respectively. Elements 56 and 58 are, in turn, mounted for rotation on an axis extending transversely to the path of travel of vehicle 22 by an axle 60 extending through a sleeve bearing 62 (FIG. 3) carried intermediate the ends of an elongated, rigid, generally upright member 64. The latter is pivotally mounted at one end thereof for fore-and-aft swinging movement with respect to vehicle 22 by a support 66 rigidly carried by the vehicle. The axis of swinging movement of member 64 is parallel to the axis of swinging movement of the plates 56 and 58.

Member 64 forms a part of manually manipulable mechanism available to the vehicle operator and coupled to the shiftable structures 50 and 52 for varying the displacement of the devices 32 and 36. The manually manipulable mechanism includes a second member or lever 68 having a disc 70 rigidly secured to the lowermost end thereof and mounted for rotation about an axis which extends through and is aligned with a fore-and-aft directed bearing sleeve 72 carried at the uppermost end of member 64 as illustrated best in FIG. 1.

A grip 74 may be provided at the outermost end of lever 68 to facilitate manual manipulation of the latter by the vehicle operator. Elongated, rigid connectors 76 and 78 are pivotally coupled on opposite sides of the fore and aft axis of swinging movement of levers 68 as illustrated in FIG. 2. The lowermost ends of connectors 76 and 78 are pivotally coupled to the respective plates 56 and 58 at points spaced rearwardly from the axis of swinging movement of the plates with respect to member 64. By this arrangement, and by virtue of the coupling of the structures 50 and 52 to the respective plates as illustrated best in FIG. 1, fore-and-aft movement of the control mechanism as illustrated by the arrow designated 80 in FIG. 1, rotates the plates 56 and 58 simultaneously and in like directions about the transversely extending axis of pivotal coupling to members 64. On the other hand, movement of lever 68 in a transverse direction with respect to the path of travel of the vehicle and as illustrated by the arrow designated 82 in FIG. 2, causes movement of one of the plates 56–58 in one direction, while the other plate moves in the opposite direction.

The coupling of the plates 56 and 58 with the respective devices 32 and 36 is such that the latter may be manipulated by the vehicle operator to move the structures from their neutral positions simultaneously and in the same directions to either drive the vehicle forwardly or to reverse the direction of movement of the vehicle. So long as the operating lever 68 is moved on the path of travel designated by arrow 80, both ground wheels are driven at the same speed and this speed may be regulated by the position of the control mechanism with respect to the transverse axis of swinging movement of the control mechanism about support 66. However, at any position of the control structure with respect to support 66, it is possible for the operator to move the lever 68 laterally along path 82 to cause a consequent speeding of one of the ground wheels with a corresponding slowing of the other ground wheel to steer the vehicle. The linkage 50 and 52 may be adjusted so that the mid-range or neutral position of devices 32 and 36 is achieved when the control mechanism is at the midpoint of a convenient range of fore-and-aft swinging movement of lever 68.

A pivoted lever lock 84 cooperable with outwardly extending lugs 86 carried by each plate 56 and 58 respectively, may be provided, if desired, for holding the control mechanism in the neutral position. When the operator desires to drive the vehicle in a forward direction he can merely tip the lock 84 comprising a pair of hooks 88 rigidly secured for rotation together about pivot point 90 to disengage the plates 56 and 58. Forward movement of lever 68 places the vehicle in forward motion. As lever 68 is progressively moved away from the neutral position, the speed of the vehicle is progressively increased. Similarly, movement of lever 68 to the rear from the neutral position will cause the vehicle to travel in a reverse direction and the further lever 68 is swung, the faster the vehicle will travel. Throughout the entire range of fore-and-aft travel of lever 68, however, steering of the vehicle may be accomplished by lateral swinging of lever 68.

An alternate form of control mechanism embodying the principles of this invention is illustrated in FIGS. 5–7. The hydraulic systems to be controlled by this embodiment of the invention are identical with that described with respect to control 20 and are, therefore, illustrated only fragmentarily by a showing of the forward ends of shiftable structures 150 and 152 which are comparable to the structures 50 and 52 previously described.

A vehicle control illustrated in FIGS. 5–7 is broadly designated by the numeral 120 and includes a control lever 168 mounted on a support 166 comprising a part of the vehicle 122. A universal joint broadly designated 92 includes a bifurcated mount 94 having a pair of forwardly projecting flanges 96, and a rearwardly extending stub shaft 98 received in a fore-and-aft bearing 100 carried by support 166. An elongated leg 102 of a T-shaped member 104 is received between the spaced-apart flanges 96 and is pivotally attached to the latter by a pin 106 extending transversely to the path of travel of the vehicle. Pin 106 is normal to and intersects the longitudinal axis of shaft 98.

A pair of rearwardly diverging, elongated, rigid connectors 176 and 178 are pivotally coupled at the forwardmost ends thereof through ball and socket joints 108 to the outwardly extending flanges 110 of T-bar 104 as illustrated in FIGS. 5–7. The rearmost ends of connectors 176 and 178 are pivotally coupled to the outermost ends of elongated elements 156 and 158 respectively. Each element is pivotally coupled to the support 166 for pivoting about spaced-apart, vertically extending axles 160. The structures 150 and 152 are also pivotally coupled to elements 156 and 158 respectively, as illustrated best in FIG. 5 whereby fore-and-aft movement of lever 168 along path 180 (FIG. 6) shifts both elements 156 and 158 simultaneously and in like directions to effect corresponding control over devices 32 and 36 as heretofore described.

On the other hand, the lateral swinging movement of lever 168 causes rotation of shaft 98 in bearing 100. By virtue of the vertical spacing of the connectors 176 and 178 above shaft 98, this lateral movement of the lever pulls one of the elements 156 or 158 forwardly about its pivot 160 and simultaneously pushes the outer element to the rear about its pivot 160. Such action speeds one of the vehicle ground wheels and causes corresponding slowing of the other ground wheel to steer the vehicle as heretofore described. Further, the steering may be accomplished at any position along the fore-and-aft path of movement of lever 168 in the same manner as described with respect to control 20.

Referring now to FIGS. 8–10, a modified form of vehicle control 220 is illustrated in connection with shiftable structures 250 and 252. It will be understood that the structures 250 and 252 are also operably coupled with fluid flow control devices such as 32 and 36 for controlling hydraulic systems as has been previously described. Control 220 includes an elongated, rigid lever 268 mounted at its lowermost end with a universal joint 292 so that lever 268 may be rotated on its longitudinal axis and may also be shifted along a fore-and-aft path of travel designated by the arrow 280 in FIG. 9. A transversely extending bar 210 rigidly secured to lever 268 intermediate the ends thereof is pivotally coupled as illustrated in FIG. 10 through universal joints 208 to the forwardmost ends of the structures 250 and 252 respectively. An operating handle 274 in the form of a D-shaped ring is secured to the uppermost end of lever 268 to facilitate operation of the latter by the vehicle operator.

Manifestly, the movement of lever 268 along its fore-and-aft path of travel causes simultaneous shifting in like directions of structures 250 and 252 to control the speed and direction of travel of the vehicle ground wheels in the manner hereinabove described. Rotation of lever 268 about its longitudinal axis, as is permitted by the swivel connection of lever 268 in the spherical portion of the universal joint 292, causes consequent movement of one of the structures 250–252 forwardly, while the other structure is moved rearwardly. This movement causes consequent speeding of one vehicle ground wheel and slowing of the other for steering the vehicle in the manner outlined above. Further, it will be recognized that this steering operation may be carried out while lever 268 is at any position thereof throughout its fore-and-aft range of travel.

Universal joint 392 shown in FIGS. 12 and 13 may be substituted at the lower end of lever 368 for the joint 292 with substantially the same good results. Fore and aft swinging movement of lever 368 takes place about the axis of pivotal connection 394, friction discs 396 operating to yieldably hold lever 368 against free swinging movement. Plate 397 between discs 396 has a bearing 398 secured thereto and rotatably receiving lever 368, the latter being retained in place by cross pin 399.

Having thus described the invention, what is claimed as new and desired to be secured by Letters Patent is:

1. In a vehicle having a pair of wheels, a hydraulic motor for driving each wheel respectively and a variable fluid flow regulating device for each motor respectively, each device having shiftable actuating structure for increasing or decreasing the flow of fluid to said motors in either of two opposite directions, a control for said structures comprising:
   a mount rotatably carried by the vehicle for oscillation about a horizontal axis extending fore and aft of the vehicle;
   an upstanding lever secured to said mount for swinging movement fore and aft of the vehicle about a transverse axis intersecting said horizontal axis;
   a pair of elements attached to the vehicle for swinging movement about vertical axes;
   means pivotally coupling the elements with corresponding actuating structures; and
   mechanism pivotally connecting the lever with said elements for shifting said structures simultaneously in the same direction upon fore and aft swinging of the lever and for shifting the structures simultaneously in opposite directions when the lever is swung laterally of the vehicle about said horizontal axis.

2. The invention of claim 1,
   said mechanism including a pair of opposed members rigid to the lever, and
   a pair of connectors pivotally interconnecting the members and the elements.

References Cited

UNITED STATES PATENTS 1,928,915    10/1933    Stout    180—77
3,323,607    6/1967    Futamata    180—6.48

OTHER REFERENCES

DAS 1,189,395 German printed application, March 1965, Richard, 180–77(H), 13 sht. dwng. 6 pp. spec.

BENJAMIN HERSH, Primary Examiner

J. A. PEKAR, Assistant Examiner

U.S. Cl. X.R.

74—421